United States Patent Office 3,301,844
Patented Jan. 31, 1967

3,301,844
UNSYMMETRICAL DISAZO FORMAZANE DYES
Willy Steinemann, Basel, Switzerland, assignor to Sandoz Ltd. (also known as Sandoz AG.), Basel, Switzerland
No Drawing. Filed Mar. 25, 1964, Ser. No. 354,753
Claims priority, application Switzerland, May 19, 1960,
5,721/60
6 Claims. (Cl. 260—146)

The present invention is a continuation-in-part application to our co-pending application Ser. No. 109,526, filed on May 12, 1961, now abandoned, and relates to new azo dyes which possess excellent properties.

They have the general formula:

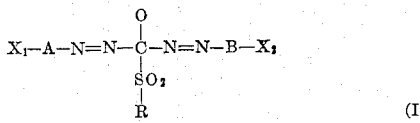

(I)

and can be metallized.

In this formula

A and B are different isocyclic aromatic or heterocyclic radicals of aromatic character, R is an alkyl, an aralkyl, a cycloalkyl or a mono- or dinuclear aromatic radical, $X_1$ and $X_2$ are identical or different groups capable of metal complex formation and occupying positions adjacent to the nitrogen bridge.

These dyes belong to the formazene series.

A further object of the invention is the process of production of the dyes as described in the following, and their use for the dyeing and printing of fibers and fiber materials and the products thereby obtained.

The radicals A, B and R may be substituted with one or more radicals which are water-solubilizing or do not increase the solubility in water. Suitable radicals of this type are, e.g., sulphonic acid, carboxylic acid and sulfonic groups, sulfamide groups which may be substituted on the nitrogen atom, alkyl groups, in particular those having up to four carbon atoms, alkoxy groups, nitro groups, halogen atoms, in particular fluorine, chlorine or bromine atoms, halogen-containing N-heterocyclic compounds, e.g., mono- or dihalogenotriazine radicals, di-or trihalogeno-pyrimidine radicals or the acrylic acid radical. Further substitutents of the radicals A, B and R which are especially important are amino, hydroxy and thiol groups which are linked with the radical directly or through a bridge member and contain reactive hydrogen, and group which are convertible into the aforesaid groups, because these can be reacted with di- or trihalogenotriazines or tri- or tetrahalogenopyrimidines or generally with compounds possessing more than one mobile halogen atom, to give reactive dyestuffs.

These new compounds are obtained when diacylmethanes of the formula $$R_1-CH_2-R_2 \quad (II)$$

wherein $R_1$ represents the radical of the aliphatic, cycloaliphatic or aromatic sulfonic acids and $R_2$ represents the radical of the aliphatic, cycloaliphatic or aromatic monocarboxylic acids or of the corresponding sulfonic acids, are coupled stepwise with diazotized amines and the acyl group $R_2$ in the diacylmethane radicals of the resulting intermediate compound is split off before or during the second coupling.

The number of cylically arranged carbon atoms in these acids generally amounts to about 10, and those in the aliphatically bound acids to about 6, but the radicals may also be higher molecular. The hydrocarbon radicals of the acyl groups may contain substitutents which are water-solubilizing and/or which do not increase or which diminish the water-solubility of the dyes. In particular they may be sulfonamide groups whose hydrogen atoms may be replaced by hydrocarbon radicals which may themselves be further substituted, or nitro, sulfonic acid, carboxy, sulfon, alkylsulfamido or arylsulfamino group, or acetylated amino groups or urethane groups. The acetylated amino groups or urethane groups can be converted into an amino group by saponification of the final dye. The nitro group can be similarly reduced in the final dye.

These diacylmethanes are coupled with diazotized amines. It is possible, for example, to couple 1 mol of a diacylmethane with 1 mol of a diazo compound and subsequently with 1 mol of a diazo compound different from the first or with half a mol of a tetrazo compound. Also 2 mols of diacylmethane can be coupled in either order with 1 mol of a tetrazo compound and 2 mols of a diazo compound.

The diazotized monoamines and tetrazotized diamines used in the azo dyes chemistry can be used as diazo or tetrazo compounds. They may belong to the aromatic series, in particular the benzene and napththalene series, or the series of heterocyclic compounds of aromatic character. At least one of the diazo or tetrazo compounds to be coupled with the diacylmethane contains in ortho position to an azo group a substituent which is capable of forming complex compounds with metals, e.g., a hydroxy, carboxyl, sulfonic acid amide or amino group or a group which can be converted into such a substituent before or during the metallizing reaction, e.g., an alkyloxy group.

Besides these substitutents, other substitutents which increase or do not increase or descrease the water-solubility can be contained in the diazotized or tetrazotized amine, for example the substitutents named in the description of the diacylmethanes.

After the first coupling reaction, one acyl radical of each molecule of the diacylmethane must be split off to enable it to react with a second molecule of a diazotized amino compound. In many instances cleavage of the acyl radicals takes place of itself during the second coupling reaction. A quicker and more reliable way, however, is to effect cleavage of the acyl radicals by saponification with alkaline agents by the addition of, e.g., basic salts or the hydroxides of alkalis or earth alkali metals. Often an addition of ammonia, magnesium oxide, sodium bicarbonate or sodium carbonate is sufficient.

The optimum pH value lies between about 8 and 13. It is of advantage to add to the reaction medium an anti-oxidizing agent, e.g., sodium sulfite or sodium thiosulfite or the alkaline salts of sulfurous acid or thiosulfuric acid, and also if desired compounds with reducing action such as grape sugar.

The coupling reactions are carried out under the normal conditions, e.g., at temperatures between about —10° C. and +35° C. and at a pH value between about 5 and 9.

In the second coupling reaction there is no danger of the acyl radicals being saponified and no precautionary measures are necessary. The reaction takes place in aqueous alkaline suspension without the addition of an organic solvent, but organic solvents and also dispersing agents can be used if desired. Especially suitable solvents are, e.g., dimethyl formamide and formamides generally substituted or unsubstituted hydrocarbons, e.g., chlorobenzene, and pyridine. They are employed in amounts approximately 1 to 5 times greater than the weight of the coupling component.

The metallization of the azo dyes obtained is carried out by the normal methods either in substance or on the fiber. It is effected by reacting the dyes with solutions of metal salts, preferably the salts of copper, cobalt, nickel, chromium or zinc to obtain 1:1 metal complex dyes, at a temperature between about 40° and 70° C. Preferably, the amount of metal salt used should be such that the resulting complex compounds of disazo dyes contain one atom of copper, nickel, cobalt or zinc and those of tetrazo dyes 2 atoms of copper, nickel, cobalt or zinc and in the case of the other metals a quantity of the corresponding valency. The azo dyes containing cobalt or chromium atoms may be either 1:1 or 1:2 metal complex dyes.

The metallizing reaction can be conducted in an aqueous medium or in organic solvents, e.g., mixtures containing formamides, glycols, polyglycols or acetamide or in mixtures of these and water. This reaction can be carried out simultaneously with the second coupling by conducting the latter reaction in presence of solutions of metal salts.

The dyes obtained are suitable for dyeing, padding, printing and as pigments, depending on whether they contain water-solubilizing groups or not.

All natural and artificial fibers and fiber materials can be dyes or printed with them, e.g., fibers, filaments, yarns, woven fabrics and knitted goods or natural or regenerated cellulose such as cotton, linen, viscose filament or staple fiber, cellulose acetate and cellulose triacetate, wool, silk, polyamide fibers of dicarboxylic acids and diamines, polymeric lactams or ω-aminomonocarboxylic acids or of polyterephthalic acid ethylene glycol ethers.

The dyeings obtained are intense and brilliant in shade, fast to washing, boiling, perspiration, milling, crocking, potting, alkalis, stowing, decatizing, carbonizing, hot pressing, sea water and light, and stable to acids.

In the examples the parts and percentages are by weight and the temperatures in degrees centigrade.

*Example 1*

22.2 parts of acetyl-4-methylbenzenesulfonylmethane are dissolved at room temperature in 120 parts of water with the addition of 16 parts of 30% sodium hydroxide solution. This solution, cooled to 0°, is added to a diazo solution which is produced in the normal way from 13.7 parts of 2-aminobenzene-1-carboxylic acid and neutralized with sodium bicarbonate. Subsequently, stirring is carried out at 0–2° until no further diazo compound is evident.

The completely precipitated yellow dyestuff obtained is filtered off with suction and dissolved in 200 parts of water containing 48 parts of 30% sodium hydroxide solution and 16 parts of 40% sodium sulfite. This solution is stirred at 60–70° until the bright yellow color changes to olive-green. It is then quickly cooled to 0° and an ice-cold neutralized diazo suspension of 18.8 parts of 2-amino-1-hydroxy-benzene-4-sulfamide is run in. After stirring the solution at 0° until completion of the coupling reaction, the resulting dyestuff is salted out with sodium chloride, filtered off, dried and ground. It is a brown powder which dissolves in water with a red coloration and dyes wool and polyamide fibers from neutral or weakly acid baths. Dyeings treated with zinc, copper-, cobalt or nickel-yielding agents are navy, blue-green or bordeaux, and have very good fastness properties.

For metallizing in substance, the dyestuff is dissolved in strongly ammonia-alkaline medium, to which sufficient metallizing agent is added until it is in excess. Dyes metallized in this way dye wool and polyamide fibers from neutral to weakly acid baths. The dyeings obtained are brilliant blue, blue-green or pale greyish bordeaux, and have good fastness properties.

Very similar dyestuffs with equally good properties are obtained when the 22.2 parts of acetyl-4-methylbenzenesulfonylmethane in Example 1 are replaced by an equivalent amount of acetyl-4-chloro-3-carboxybenzene-sulfonyl-methane,
acetyl-4-chlorobenzensulfonylmethane,
acetyl-4-benzoylaminobenzenesulfonylmethane,
acetyl-2,4,6-trimethyl-benzenesulfonylmethane,
acetyl-dimethylaminosulfoaminobenzenesulfonylmethane,
acetyl-3-methylsulfonylaminobenzenesulfonylmethane,
acetyl-4-phthaloylamino-benzenesulfonylmethane,
acetyl-5-acetamino-naphthalene(1)-sulfonylmethane,
acetyl-5-acetamino-naphthalene(2)-sulfonylmethane,
methylsulfonylacetone or the 13.7 parts 1-aminobenzene-2-carboxylic acid are replaced by the equivalent amount of 4-methylsulfonyl-1-aminobenzene-2-carboxylic acid,
1-aminobenzene-2-carboxylic acid-4-sulfonic acid methylamide,
1-aminobenzene-2-carboxylic acid-4-sulfonic acid 3-methoxy-n-propylamide,
1-aminobenzene-2-carboxylic acid-4-sulfonic acid 2'-carboxy-phenylamide,
1-aminobenzene-2-carboxylic acid-4-sulfonic acid phenylamide or the 18.8 parts of 2-amino-1-hydroxybenzene-4-sulfonic acid amide are replaced by the equivalent amount of 2-amino-1-hydroxybenzene-4-sulfonic acid phenylamide,
2-amino-1-hydroxybenzene-4-sulfonic acid 2'-carboxyphenylamide,
2-amino-1-hydroxybenzene-4-sulfonic acid methylamide,
2-amino-1-hydroxybenzene-4-sulfonic acid 3'-methoxy-n-propylamide,
2-amino-1-hydroxybenzene-4-sulfonic acid-3'-dimethylamino-n-propylamide,
2-amino-1-hydroxybenzene-4-sulfonic acid morpholide,
2-amino-1-hydroxybenzene, and the process otherwise carried out as described.

*Example 2*

26.4 parts of 2-amino-1-hydroxybenzene-4-sulfonic acid phenylamide are diazotized at 0–5° in 100 parts of water and 18 parts of 30% hydrochloric acid with 6.9 parts of sodium nitrite. The resulting diazo suspension is neutralized, run into an ice-cold solution of 26.5 parts of acetyl-4-acetaminobenzenesulfonylmethane, 180 parts of water and 4.8 parts of sodium hydroxide and the mixture stirred at 0° until the coupling reaction is completed. The resulting dyestuff is precipitated with sodium chloride, filtered off with suction and then added to a solution of 300 parts of water, 64 parts of 30% sodium hydroxide solution and 16 parts of 40% sodium bisulfite solution. The yellow-colored solution is stirred at 60° until it changes to olive-green, then it is immediately cooled to 0°, added to a neutralized diazo suspension produced by the known method with 20 parts of 2-amino-1-hydroxybenzene-4-sulfonamide, and stirred at 0° until the coupling reaction is completed. After salting out with sodium chloride and filtering off, the new dyestuff can be metallized by the procedure mentioned in Example 1. Its dyeings containing zinc, copper, cobalt or nickel, on wool and synthetic polyamide fibers are blue, blue-grey or greyish bordeaux and have good fastness properties.

Very similar dyestuffs with equally good properties are obtained when in Example 2 the 26 parts of acetyl-4-acetaminobenzene-sulfonylmethane are replaced by an equivalent amount of acetyl-3-acetamino-4-methoxybenzenesulfonylmethane,
acetyl-3-acetamino-4-methylbenzenesulfonylmethane,
acetyl-4-carbethoxyaminonaphthalenesulfonylmethane,
acetyl-6-acetaminonaphthalene(2)-sulfonylmethane, Or the 26.4 parts of 2-amino-1-hydrobenzene-4-sulfonic acid phenylamide or the 20.0 parts of 2-amino-1-hydroxybenzene-4-sulfonic acid amide are replaced by the equivalent amount of 2-amino-1-hydroxybenzene-4- or -5-sulfonic acid methylamide, 2-amino-1-hydroxybenzene-4- or -5-sulfonic acid-3'-methoxy-n-propylamide,
2-amino-1-hydroxybenzene-4- or -5-sulfonic acid-3'-dimethyl-amino-propylamide,
2-amino-1-hydroxybenzene-4- or -5-sulfonic acid-dimethylamide,
2-amino-1-hydroxybenzene-4- or -5-sulfonic acid-morpholide,
2-amino-1-hydroxybenzene-4- or -5-sulfonic acid-2'-hydroxy-ethylamide,
2-amino-1-hydroxybenzene-4- or -5-sulfonic acid-2'-phenyl-ethylamide,
2-amino-1-hydroxybenzene-4- or -5-sulfonic acid-naphthyl-(2)-amide,
2-amino-1-hydroxybenzene-4- or -5-sulfonic acid-4'-methoxy-phenylamide,
2-amino-1-hydroxybenzene-4- or -5-sulfonic acid-N-methyl-phenylamide,
2-amino-1-hydroxybenzene-4- or -5-sulfonic acid-2'-methyl-phenylamide,
2-amino-1-hydroxybenzene-4- or -5-sulfonic acid-3'-chlorophenylamide,
2-amino-1-hydroxybenzene-4- or -5-sulfonic acid-2',5'-dichloro-phenylamide and the process otherwise carried out as described.

*Example 3*

An ice-cold diazo solution of 23.4 parts of 2-amino-1-hydroxy-4-nitrobenzene-6-sulfonic acid, produced and neutralized in the normal manner, is added to an ice-cold solution of 26 parts of acetylnaphthalene-(2)-sulfonylmethane, 5 parts of sodium hydroxide and 300 parts of water. The solution is stirred at 0–5° until the coupling reaction is completed, and then neutralized. The dyestuff is salted out with sodium chloride, filtered off and added to a solution of 250 parts of water, 15 parts of sodium hydroxide and 8 parts of sodium sulfite.

This mixture is stirred at 45° until the red-yellow colored solution is deep brown. It is then immediately cooled to 0°, added to a neutralised diazo suspension produced with 15.4 parts of 2-amino-1-hydroxy-4-nitrobenzene at 0°, and stirred at this temperature until the reaction is completed. The new dyestuff is isolated and dried in the normal way.

58 parts of this dyestuff are heated in 800 parts of an aqueous solution of 27.5 parts of copper sulfate and 30 parts of crystalline sodium acetate at 90–100° until the dyestuff is converted into its copper complex compound. The zinc, cobalt and nickel complexes of this dyestuff can be produced in the same way.

Dyeings containing zinc, copper, cobalt or nickel on wool or synthetic polyamide fibers are blue, grey or bordeaux and have good fastness properties.

Very similar dyes with equally good properties are obtained when in Example 3 the 26 parts of acetylnaphthalene-(2)-sulfonyl-methane are replaced by the equivalent amount of acetyl-benzene-sulfonylmethane, acetyl-4-methylbenzene-sulfonylmethane or acetyl-4-chlorobenzene-sulfonylmethane.

Or the 23.4 parts of 2-amino-1-hydroxy-4-nitrobenzene-6-sulfonic acid by an equivalent amount of 2-amino-1-hydroxy-6-nitrobenzene-6-sulfonic acid,
2-amino-1-hydroxy-4-chlorobenzene-6-sulfonic acid,
2-amino-1-hydroxy-4-phenylbenzene-6-sulfonic acid,
2-amino-1-hydroxybenzene-4-sulfonic acid,
1-amino-2-hydroxynaphthalene-4-sulfonic acid,
1-amino-2-hydroxy-6-nitronaphthalene-4-sulfonic acid,
2-amino-1-hydroxybenzene-4-carboxylic acid,
2-amino-1-hydroxybenzene-4-carboxylic acid-6-sulfonic acid,
2-amino-1-hydroxybenzene-4-sulfonic acid-3'-sulfophenylamide,
2-amino-1-hydroxy-4-acetylaminobenzene.

Or the 15.4 parts of 2-amino-1-hydroxy-4-nitrobenzene by the equivalent amount of 2-amino-1-hydroxy-4-nitro-6-chlorobenzene,
2-amino-1-hydroxy-6-nitro-4-chlorobenzene,
2-amino-1-hydroxy-5-nitro-4-chlorobenzene,
2-amino-1-hydroxy-4-pyrrolidonylbenzene,
2-amino-1-hydroxy-4-oxazolidonylbenzene,
2-amino-1-hydroxy-4-carbethoxyaminobenzene,
2-amino-1-hydroxy-4-acetylaminobenzene,
2-amino-1-hydroxy-4,6-dinitrobenzene,
2-amino-1-hydroxy-4,6-dichlorobenzene,
2-amino-1-hydroxy-4,5-dimethylbenzene.

*Example 4*

A neutralized diazo solution produced from 26.9 parts of 2-amino-1-hydroxybenzene-4,6-disulfonic acid is run into an ice-cold solution of 21 parts of acetyl-benzene-sulfonylmethane, 5 parts of sodium hydroxide and 200 parts of water and stirred at 0° until the coupling reaction is completed. The yellow-red dyestuff solution obtained is heated with 48 parts of 30% sodium hydroxide solution at 40° until it becomes dark brown. The solution is cooled immediately to 0°, added with good stirring to an ice-cold neutralized diazo solution of 18 parts of 4-acetaminoaniline, and stirring continued at 0° until the coupling reaction is completed. The dyestuff is isolated in the normal way and heated in an aqueous solution containing the necessary amount of copper acetate for metal complex formation, until the complex is formed.

Wool and synthetic polyamide fibers are dyed with this copper complex from an acid bath and have fast blue shades.

The nickel complex produced in the same way gives fast bluish red shades on wool and polyamide fibers.

Equally good and very similar dyestuffs are produced when the 18 parts of 1-amino-4-acetaminobenzene in this example are replaced by the equivalent amount of 1-amino-4-carboethoxyaminobenzene,
1-amino-4-benzoylaminobenzene,
1-amino-4-phthalolylaminobenzene,
1-amino-4-maleylaminobenzene,
1-amino-4-pyrrolidonylbenzene,
1-amino-4-oxazolidonylbenzene,
1-amino-3-sulfonamidobenzene,
1-amino-2,4-dimethylbenzene,
1-amino-2- or 4-chloroaniline,
1-amino-2- or 4-methylbenzene,
1-amino-3-nitrobenzene,
1-amino-4-acetylbenzene.

*Example 5*

A neutralized diazo solution produced from 18.9 parts of 2-amino-1-hydroxybenzene-4-sulfonic acid is run into an ice-cold mixture of 30.5 parts of acetyl-4-acetaminonaphthalene-(1)-sulfonylmethane, 5 parts of sodium hydroxide and 350 parts of water and stirred at 0° until the reaction is completed. The dyestuff formed is precipitated with common salt, filtered with suction and added to 400 parts of water. Then 8 parts of sodium sulfite and 48 parts of 30% sodium hydroxide solution are added and the solution heated at 45° until the yellow color of the solution changes to olive-brown. The solution is immediately cooled to 0° and then slowly added to a mixture of 130 parts of a 20% copper sulfate solution ($CuSO_4 \cdot 5H_2O$), 13.5 parts of triethanolamine and 28 parts of 1-diazo-2-hydroxy-naphthalene-4-sulfonic acid, which is adjusted to a pH value of 13 with the necessary amount of sodium hydroxide solution. Care is taken that the temperature does not rise above approximately 25°. Subsequently, stirring is continued at 25° until the coupling reaction is completed. The new copper containing dyestuff is isolated by neutralising, salting out, filtering off and washing with sodium chloride solution. When dried it is a dark powder which dissolves in water with a blue coloration, and dyes wool and polyamide fibers from acid baths in brilliant, fast blue shades.

When the equivalent amount of nickel sulfate is used in place of copper sulfate a nickel complex is obtained which dyes wool and polyamide fibers in brilliant, fast reddish blue shades.

When in Example 5 the 30.5 parts of acetyl-4-acetaminonaphthalene (1)-sulfonylmethane are replaced by the equivalent amount of acetyl-4-methyl-3-acetaminobenzene-sulfonylmethane,
acetyl-4-methoxy-3-acetaminobenzene-sulfonylmethane,
acetyl-5-acetaminonaphthalene (2)-sulfonylmethane, Or the 18.9 parts of 2-amino-1-hydroxybenzene-4-sulfonic acid by the equivalent amount of 2-amino-1-hydroxy-4-chlorobenzene-6-sulfonic acid,
2-amino-1-hydroxy-4-nitrobenzene-6-sulfonic acid,
2-amino-1-hydroxy-6-nitrobenzene-4-sulfonic acid,
2-amino-1-hydroxy-4-phenylbenzene-6-sulfonic acid,
2-amino-1-hydroxy-4-phenylbenzene-4'-sulfonic acid,
2-amino-1-hydroxy-4-carboxybenzene-6-sulfonic acid,
2-amino-1-hydroxy-6-carboxybenzene-4-sulfonic acid,
2-amino-1-hydroxybenzene-4,6-disulfonic acid, Or the 28 parts of 1-diazo-2-hydroxynaphthalene-4-sulfonic acid by 32 parts of 1-diazo-2-hydroxy-6-nitronaphthalene-4-sulfonic acid very similar dyestuffs with equally good properties are obtained.

*Example 6*

21.3 parts of acetyl-4-methylbenzenesulfonylmethane are dissolved in 250 parts of water with 16 parts of 30% sodium hydroxide solution at room temperature. This solution, cooled to 0°, is added to a neutralised tetrazo solution produced in the known manner from 15 parts of 4,4'-diamino-3,3'-dicarboxydiphenyl and the solution stirred at 0–5° until the coupling reaction is completed. The completely precipitated yellow dyestuff formed is filtered off with suction and then added to a mixture, heated to 60°, of 400 parts of water, 48 parts of 30% sodium hydroxide solution and 16 parts of 40% sodium bisulfite solution. The solution is stirred at 60° until the color changes from yellow to olive-green. It is cooled rapidly to 0° and a neutralised diazo suspension of 18.8 parts of 2-amino-1-hydroxybenzene-4-sulfonamide is added. After stirring at 0° until completion of the coupling reaction, the resulting dyestuff is salted out, filtered and finally converted into its copper complex as described in Example 3. The dyeings obtained with this copper complex on cotton and regenerated cellulose are brilliant blue and very fast.

Very similar dyestuffs of equal interest are obtained when, the 21.3 parts of acetyl-4-methylbenzenesulfonylmethane in the example, are replaced by the equivalent amount of acetyl-2-methylbenzene-sulfonylmethane,
acetylbenzene-sulfonylmethane,
acetylnaphthalene-(2)-sulfonylmethane,
acetyl-3-carboxybenzene-sulfonylmethane, Or the 18.8 parts of 2-amino-1-hydroxybenzene-4-sulfonic acid by an equivalent amount of 2-amino-1-hydroxy-4-nitrobenzene,
2-amino-1-hydroxy-4,6-dinitrobenzene,
2-amino-1-hydroxy-4-nitro-6-chlorobenzene,
2-amino-1-hydroxy-4,6-dichlorobenzene,
2-amino-1-hydroxybenzene,
2-amino-1-hydroxy-4-chlorobenzene,
1-aminobenzene-2-carboxylic acid,
1-amino-2-carboxybenzene-4-sulfonic acid amide,
1-amino-2-carboxybenzene-4-sulfonic acid methylamide,
2-amino-1-hydroxybenzene-4-sulfonic acid phenylamide,
2-amino-1-hydroxybenzene-4-sulfonic acid phenylamide-2'-carboxylic acid.

*Example 7*

30.5 parts of 5-acetoaminonaphthalene-(2)-sulfonylacetylmethane are dissolved in 200 parts of water with the addition of 15 parts of 30% sodium hydroxide solution. This solution cooled to 0°, is added to a neutral, ice-cold diazo solution of 20 parts of 2-amino-1-hydroxybenzene-4-sulfonic acid, and then stirred at 0° until formation of the dyestuff is completed. 16 parts of 40% sodium bisulfite solution and 48 parts of 30% sodium hydroxide solution are added and the solution stirred at room temperature until the color changes from yellow to olive-green. The dyestuff is then salted out with sodium chloride at pH 8.5.

47 parts of the dyestuff thus produced are dissolved in 20 parts of sodium carbonate in 400 parts of water at room temperature. After the addition of a solution of 130 parts of 20% copper sulfate solution and 13.5 parts of triethanolamine, the whole is cooled to 0° and an ice-cold, neutral tetrazo solution obtained by tetrazotizing 9.7 parts of 4,4'-diaminodiphenyl is added. The solution is stirred at 0° until completion of the coupling reaction. The reaction solution is then heated to 80–90°, the copper-containing tetrazo dyestuff precipitated with sodium chloride, filtered off and washed with sodium chloride solution.

This dyestuff gives blue dyeings on cellulose, which are fast to light and treatments. The nickel-containing dyestuffs, prepared in an analogous manner, also give blue dyeings of equally good fastness. Very similar and equally good dyestuffs are obtained when the following are used as diacylmethane-benzensulfonyl-acetyl-methane:

2- or 4-methylbenzenesulfonyl-acetylmethane,
naphthalene-(2)-sulfonylacetyl-methane,
tetrahydronaphthalene-(1)-sulfonylacetyl-methane,
4-acetamino-naphthalene-(1)-sulfonyl-acetyl-methane,
4-acetamino-benzenesulfonyl-acetyl-methane,
4-methylsulfonylamino-benzensulfonyl-acetyl-methane, or
4-dimethylaminosulfonylamino-benzenesulfonyl-acetyl-methane,
4-carbethoxyamino-naphthalene-(1)-sulfonyl-acetyl-methane or
4-benzoylaminoaphthalene-(1)-sulfonyl-acetylmethane.

Suitable diazotizable monamino compounds are:

2-amino-1-hydroxy-4-chlorobenzene-6-sulfonic acid,
2-amino-1-hydroxy-4-carbethoxy-aminobenzene-6-sulfonic acid,
2-amino-1-hydroxy-6-carbethoxyaminobenzene-4-sulfonic acid,
2-amino-1-hydroxy-4-nitrobenzene-6-sulfonic acid,
2-amino-1-hydroxy-6-nitrobenzene-4-sulfonic acid,
1-amino-2-hydroxy-naphthalene-4-sulfonic acid,
2-amino-1-hydroxybenzene-4,6-disulfonic acid,
2-amino-1-carboxybenzene-4-(or -5-) sulfonic acid,
2-amino-benzene-1-carboxylic acid,
2-amino-5-nitrobenzene-1-carboxylic acid,
2-amino-1-carboxy-benzene-5-sulfonic acid-methylamide,
2-amino-1-carboxy-benzene-5-sulfonic acid-phenylamide (or o-carboxyphenylamide),
2-amino-1-hydroxybenzene-4-sulfonic acid-phenylamide (or o-carboxyphenylamide),
2-amino-1-hydroxy-benzene-4- (or -5-) sulfonic acid amide,
2-amino-1-hydroxy-4-chloro- (4 or 5-nitro)-benzene,
2-amino-1-hydroxy-4-pyrrolidonylbenzene,
2-amino-1-hydroxy-4-oxazolidonylbenzene,
2-amino-1-hydroxy-4-methylsulfaminobenzene or
2-amino-1-hydroxy-4-dimethylaminosulfaminobenzene.

Other suitable tetrazotizable diamino compounds are, e.g., 4,4'-diaminodiphenyl-1,1'-fumaric acid diamide,
4,4'-diamino-3,3'-dicarboxy-diphenyl-1,1'-fumaric acid diamide, 4,4'-diaminodiphenyl urea,
4,4'-diamino-3,3'-dicarboxydiphenylurea,
4,4'-diamino-3,3'-dicarboxyldiphenyl,
4,4'-diaminodiphenyl,
4,4'-diamino-3,3'-dimethyl- (or -dichloro) diphenyl,
4,4'-diamino-3,3'-dimethoxy-diphenyl,
4,4'-diamino-3,3'-dihydroxy-diphenyl or
4,4'-diamino-3,3'-dihydroxy-diphenyl or
4,4'-diamino-3,3'-diphenoxy-acetic acid.

*Example 8*

26.4 parts of 2-amino-1-hydroxybenzene-4-sulfonic acid phenylamide are dissolved in hot water with 12 parts of 30% hydrochloric acid and, after the addition of a further 7.5 parts of 30% hydrochloric acid, diazotized at 5° with a solution of 6.9 parts of sodium nitrite in 50 parts of water. The pH value of the yellow diazo suspension is then increased to 9.5 with the necessary amount of 15% sodium carbonate solution. 14 parts of methylsulfonyl acetone are added dropwise with vigorous stirring in 20 minutes at 0°, and stirring continued at this temperature until the end of the coupling reaction, the pH value being maintained between 9.5 and 10 by the addition of sodium carbonate. The resulting yellow monoazo dyestuff is precipitated completely by the dropwise addition of dilute hydrochloric acid until the pH value is 8, then filtered with suction and washed in cold water. The filter cake is then added to a solution of 7.5 parts of sodium sulfite, 10.8 parts of sodium hydroxide and 250 parts of water. This is heated at 95° for 20 minutes, cooled rapidly to 0°, the pH value decreased from 11.5 to 10 with dilute hydrochloric acid and the yellow-brown solution added to an ice-cold neutralized diazo suspension, which is produced by the known method from 15.4 parts of 2-amino-1-hydroxy-4-nitrobenzene. The solution is stirred again at 0° until the coupling reaction is completed. The new dyestuff is precipitated by neutralizing with dilute hydrochloric acid, filtered off and washed with dilute common salt solution. In order to convert it into the copper-containing complex compound, the filter cake is added to 525 parts of an aqueous solution of 5% copper sulfate ($CuSO_4 \cdot 5H_2O$) and the whole heated at 95° for 2 hours. After cooling to room temperature, the copper complex compound is completely precipitated with salt, filtered off, washed with aqueous sodium chloride solution and dried. When ground, the dyestuff is obtained as a dark powder which dissolves in water with a blue coloration and dyes wool, silk and synthetic polyamide fibers from neutral baths in fast reddish blue shades. The new dyestuff is also suitable for dyeing cellulose acetate in the spinning solution. The nickel, cobalt and zinc complex dyestuffs produced in an analogous way give somewhat more reddish but equally as fast dyeings as the copper complex compound.

Very similar dyestuffs of equal fastness are obtained when, in the above example, the diazo compound prepared from 15.4 parts of 2-amino-1-hydroxy-4-nitrobenzene is replaced by the equivalent amount of one of the following diazo compounds:

2-diazo-1-hydroxy-4-chloro-6-nitrobenzene,
2-diazo-1-hydroxy-4-nitro-6-chlorobenzene,
2-diazo-1-hydroxy-5-nitrobenzene,
2-diazo-1-hydroxy-4-chlorobenzene,
2-diazo-1-hydroxy-4-acetylbenzene,
2-diazo-1-hydroxy-4-methylsulfonylbenzene,
2-diazo-1-hydroxy-4-tert.butylbenzene,
2-diazo-1-hydroxy-4,6-dichlorobenzene,
2-diazo-1-hydroxy-4-chloro-6-nitrobenzene.

*Example 9*

5.3 parts of 2-amino-1-hydroxybenzene-4-sulfonic acid phenylamide are diazotized according to the method described in Example 8. The diazo suspension is adjusted to a pH value of 10 with the necessary amount of sodium carbonate, and then an aqueous solution of 3 parts of methylsulfonyl acetone in 20 parts of water is added dropwise at an even rate in 20 minutes. After stirring at 0° until the coupling reaction is completed, the precipitated dyestuff is filtered off and washed with dilute common salt solution. It is then dissolved in 130 parts of water and 20 parts of 25% aqueous ammonia solution and this solution heated for 25 minutes at 95°. It is subsequently cooled to 0° and added to an ice-cold diazo suspension prepared from 4.1 parts of 2-amino-1-hydroxybenzene-4-sulfonic acid methylamide in the usual way. 23 parts of 30% sodium hydroxide solution are then added in 10 minutes, the reaction temperature being maintained at below +2° by intensive cooling. On completion of coupling, the pH value is adjusted to 8 with acetic acid and the precipitated dyestuff filtered off. Its dyeings on wool, aftertreated with a copper, cobalt or nickel-yielding agent, are grey and possess good fastness properties. To nickelize in substance, the dyestuff is suspended in 300 parts of 2% aqueous nickel sulfate heptahydrate solution and stirred at 80° until no further metal-free dyestuff is evident. Finally the sparingly soluble dyestuff is collected on a filter and purified in the known manner. Its dyeings on wool, silk and polyamide fibers are reddish grey and possess good fastness properties.

Equally good and very similar dyestuffs are obtained when in this example the 3 parts of methylsulfonyl acetone are replaced by the equivalent amount of ethylsulfonyl acetone, n-butylsulfonyl acetone, n-propylsulfonyl acetone, n-isobutylsulfonyl acetone, n-amylsulfonyl acetone, isoamylsulfonyl acetone, n-hexylsulfonyl acetone, n-heptylsulfonyl acetone, octylsulfonyl acetone, n-decylsulfonyl acetone, n-dodecylsulfonyl acetone, benzylsulfonyl acetone, phenylethylsulfonyl acetone, cyclohexylsulfonyl acetone or methylcyclohexylsulfonyl acetone, or the 5.3 parts of 2-amino-1-hydroxybenzene-4-sulfonic acid phenylamide are replaced by the equivalent amount of 2-amino-1-hydroxybenzene-4-sulfonic acid-morpholide,
2-amino-1-hydroxybenzene-4-sulfonic acid-tetra-hydronaphthyl-(1)-amide,
2-amino-1-hydroxybenzene-4-sulfonic acid-naphthylamide (1 or 2),
2-amino-1-hydroxybenzene-4-sulfonic acid-3'-methylphenylamide,
2-amino-1-hydroxybenzene-4-sulfonic acid-4'-chlorophenylamide,
2-amino-1-hydroxybenzene-4-sulfonic acid-2'-carboxyphenylamide,
2-amino-1-hydroxybenzene-4-sulfonic acid-3'-acetoaminophenylamide,
2-amino-1-hydroxybenzene-4-sulfonic acid-2'-methoxyphenylamide,
2-amino-1-hydroxybenzene-4-sulfonic acid-2',5'-dimethoxy-phenylamide,
2-amino-1-hydroxybenzene-4-sulfonic acid-N-methylphenylamide, or the 4.1 parts of 2-amino-1-hydroxybenzene-4-sulfonic acid methylamide are replaced by the corresponding amount of 2-amino-1-hydroxybenzene-4- or -5-sulfonic acid-3'-dimethylamino-propylamide,
2-amino-1-hydroxybenzene-4- or -5-sulfonic acid-dimethyl-amide,
2-amino-1-hydroxybenzene-4- or -5-sulfonic acid-diethyl-amide,
2-amino-1-hydroxybenzene-4- or -5-sulfonic acid-cyclohexylamide,
2-amino-1-hydroxybenzene-4- or -5-sulfonic acid-2'-hydroxyethylamide,
2-amino-1-hydroxybenzene-4- or -5-sulfonic acid-3'-methoxy-propylamide, and the process otherwise carried out as already described.

Example 10

24.4 parts of acetyl-4-chloro-benzenesulfonylmethane are dissolved at room temperature in 150 parts of water with the addition of 17 parts of 30% sodium hydroxide solution. After cooling this solution to 0°, it is added to an ice-cold diazo solution prepared in the normal way with 13.7 parts of 2-aminobenzene-1-carboxylic acid and neutralised with sodium bicarbonate. It is subsequently stirred at 0-2° until completion of the coupling reaction. The precipitated dyestuff is then collected on a filter and dissolved in 300 parts of an aqueous solution consisting of 32 parts of 30% sodium hydroxide solution and 10 parts of grape sugar. The whole is stirred at 90° until the yellow solution turns to olive-green. It is then cooled to 0° as quickly as possible, and an ice-cold, neutralized diazo suspension of 10.8 parts of 4,4'-diamino-3,3'-dihydroxydiphenyl run in. After stirring at 0° until completion of the reaction, the resulting diformazyl dyestuff is precipitated with common salt.

After being carefully dried and ground the new dyestuff is obtained as a dark powder which dissolves in water with a blue coloration and is very suitable for the dyeing of cotton and regenerated cellulose. The dyeings are very fast when treated with copper, zinc, nickel or cobalt-yielding agents. They are greenish to reddish blue in shade.

For metallization in substance the dyestuff produced by the process described above, after it has been salted out and filtered off, is heated in 450 parts of a 4% copper acetate solution for 45 minutes at 80°. The copper complex formed is precipitated with common salt, filtered off and dried. The dark powder obtained dissolves in water with a blue coloration and dyes cellulose and regenerated cellulose from neutral or weakly alkaline baths in brilliant fast blue shades.

Very similar and equally good dyestuffs are obtained when in this example the 24.4 parts of acetyl-4-chloro-benzene-sulfonyl-methane are replaced by the equivalent amount of acetyl-2- or -4-methylbenzene-sulfonylmethane,
acetyl-3-carboxybenzene-sulfonyl-methane,
acetyl-naphthalene-(2)-sulfonyl-methane,
acetyl-4-acetamino-naphthalene-(1)-sulfonyl-methane,
acetyl-4-methoxy-3-acetamino-benzenesulfonyl-methane, or the 13.7 parts of 2-aminobenzene-1-carboxylic acid are replaced by the equivalent amount of 2-amino-5-chlorobenzene-1-carboxylic acid,
2-aminobenzene-1-carboxy-5-sulfonic acid,
2-aminobenzene-1-carboxy-5-sulfonic acid-methylamide,
2-aminobenzene-1-carboxy-5-sulfonic acid-2'-hydroxyethylamide,
2-aminobenzene-1-carboxy-5-sulfonic acid-3'-methoxypropylamide,
2-aminobenzene-1-carboxy-5-sulfonic acid-3'-dimethylamino-propylamide,
2-aminobenzene-1-carboxy-5-sulfonic acid-phenylamide,
2-aminobenzene-1-carboxy-5-sulfonic acid-2'-carboxyphenylamide,
2-aminobenzene-1-carboxy-5-sulfonic acid-naphthyl-(1) amide-4'-sulfonic acid, and the procedure otherwise carried out as already described.

Example 11

29.0 parts of acetyl-4-chloro-3-carboxybenzene-sulfonylmethane are dissolved in 150 parts of water at 60° using 7 parts of sodium carbonate in the form of the sodium salt. After cooling to 0°, the solution is added to an ice-cold, neutralized diazo suspension of 21.7 parts of 2-amino-1-carboxybenzene-5-sulfonic acid prepared in the normal way. Subsequently 16 parts of 30% sodium hydroxide solution are added dropwise in 20 minutes at 0° and the solution stirred at this temperature until the diazo compound has disappeared. The monoazo dyestuff is isolated by acidification, salting out and filtration, and then added, together with 10 parts of grape sugar, to 250 parts of water. The suspension is brought into solution by the addition of 48 parts of 30% sodium hydroxide solution, and this solution heated at 65° until the yellow color changes to olive-green. After cooling rapidly to 0°, a neutralized diazo solution prepared with 18.2 parts of 2-amino-5-nitrobenzene-1-carboxylic acid. After stirring until the reaction is completed, the new dyestuff is salted out and collected on a filter, and carefully dried. Its aftercoppered or afternickelled dyeings on wool are red or olive respectively.

For coppering in substance the dyestuff is suspended in 650 parts of 4% copper sulfate pentahydrate solution and stirred at 70° until no further metal-free dyestuff is indicated. After cooling to room temperature, the copper complex is precipitated completely with common salt, filtered and carefully dried. The nickel complex can be produced in an analogous way. The metal-containing dyestuffs obtained dye wool, silk and synthetic polyamide fibers from weakly acid baths in red or olive shades and the dyeings possess good fastness properties. Similar dyestuffs with equally good properties are obtained when in this example the 29.0 parts of acetyl-4-chloro-3-carboxybenzene-sulfonyl-methane are replaced by the equivalent amount of acetyl-3-carboxybenzene-sulfonyl-methane,
acetyl-3-carboxy-6-methylbenzene-sulfonyl-methane,
acetyl-3-carboxy-4-acetoaminobenzene-sulfonyl-methane.

Or the 21.7 parts of 2-amino-1-carboxybenzene-5-sulfonic acid by an equal amount of 2-amino-1-carboxybenzene-5-sulfonic acid-phenylamide,
2-amino-1-carboxybenzene-5-sulfonic acid-phenylamide-2'-carboxylic acid,
2-amino-1-carboxybenzene-5-sulfonic acid-methylamide,
2-amino-1-carboxybenzene-5-sulfonic acid-2'-hydroxy propylamide
2-amino-1-carboxybenzene,
2-amino-1-carboxybenzene-4-carboxylic acid,
2-amino-1-carboxy-5-chlorobenzene, and the procedure otherwise carried out as described above.

Example 12

35 parts of acetyl-naphthalene-(1)-sulfonyl-methane-4-sulfonic acid are dissolved at room temperature in 270 parts of water as sodium salt and cooled to 0° after the addition of 15 parts of sodium hydroxide solution. This solution is added to an ice-cold diazo solution prepared from 23 parts of 2-amino-1-carboxybenzene-5-sulfonic acid-methylamide, and then stirred at 0° until the dyestuff is completely formed. 16 parts of 40% sodium hydroxide sulfite solution and 42 parts of 30% sodium hydroxide solution are added and stirring continued at room temperature until the color of the solution changes to green-yellow. This is immediately cooled to 0° and an ice-cold diazo suspension of 17.6 parts of 1-amino-2-methoxy-5-nitrobenzene added. It is subsequently stirred further at 0° until the end of the reaction.

The isolated dyestuff dyes wool, silk and synthetic polyamide fibers from a neutral bath. The dyeings are improved in their fastness properties by treating with a metal-yielding agent such as copper, nickel or cobalt acetate.

The dyestuff can also be metallised in substance. For conversion into its copper complex the dyestuff obtained is stirred in 650 parts of a 4% copper sulfate heptahydrate solution at 85° until no further copper-free dyestuff is indicated. After isolating and drying the dyestuff in the normal way, a brown powder is obtained which dyes wool from weakly acid baths in fast brown shades. The nickel or cobalt complexes of this dyestuff, prepared in the same way, give equally fast brown or olive dyeings.

Very similar dyestuffs are obtained when in this example the 23 parts of 2-amino-1-carboxybenzene-5-sulfonic acid-methylamide are replaced by an equal amount of 2-amino-1-carboxybenzene,
2-amino-1-carboxybenzene-5-sulfonic acid-dimethylamide,
2-amino-1-carboxybenzene-5-sulfonic acid-phenylamide,
2-amino-1-carboxybenzene-5-sulfonic acid-tetrahydronaphthyl(1)-amide,
2-amino-1-carboxybenzene-5-sulfonic acid-2'-hydroxypropylamide,
2-amino-1-carboxybenzene-5-sulfonic acid-3'-methoxy-n-propyl-amide.

Or the 17.6 parts of 1-amino-2-methoxy-5-nitrobenzene by the equivalent amount of 1-aminobenzene,
1-amino-4-chlorobenzene,
1-amino-2- or -4-methylbenzene,
1-amino-2,4-dimethylbenzene,
1-amino-2,5-dichlorobenzene,
1-aminobenzene-3-sulfonic acid amide,
1-amino-4-carbethoxyaminobenzene,
1-amino-4-pyrrolidonylbenzene,
1-amino-4-oxazolidonylbenzene,
1-amino-4-acetoaminobenzene,
1-aminonaphthalene,
1-aminoazobenzene,
4-amino-4'-chlorodiphenylether, and the procedure of the example is followed in all other respects.

*Dyeing Example A*

A dyebath is prepared with 4000 parts of water, 2 parts of the metallizable dyestuff obtained according to Example 1, 7 parts of ammonium sulfate and 10 parts of Glauber's salt. 100 parts of wool are entered at room temperature, then 100 parts of 2% aqueous copper sulfate pentahydrate solution are added to the bath, which is brought to the boil in 30 minutes and maintained at the boil for a further 30 minutes. The wool is then taken out of the bath, rinsed with water and finally dried.

When 100 parts of 2% aqueous cobalt or nickel sulfate heptahydrate solution are used in place of the 100 parts of 2% aqueous copper sulfate pentahydrate solution, the corresponding cobalt or nickel-containing dyeing are obtained.

*Dyeing Example B*

100 parts of wool are entered into a dyebath at 40° consisting of 1 part of the nickel-containing dyestuff obtained according to the procedure of Example 9, 4000 parts of water and 5 parts of ammonium sulfate. The bath is brought to the boil in 30 minutes and maintained at this temperature for 1 hour. After cooling for a short time, the wool is taken out of the bath, rinsed with water and finally dried.

The corresponding copper-containing dyestuff dyeing is dyed in an analogous manner.

Synthetic polyamide fibers are dyed in the same way, and silk at a somewhat lower temperature, e.g. at 95°.

*Dyeing Example C*

20 parts of a dyestuff metallized in substance and produced according to Example 2 are ground in a ball mill for 140 hours together with 26 parts of "Lyocol O" (registered trademark), 3.5 parts of "Flotite" (registered trademark), and 150 parts of water. The finely dispersed suspension is run into 50,000 parts of water heated to 40°, then 1000 parts of a nylon fabric are entered into the dyebath which is brought to the boil in 20 minutes and maintained at this temperature for 1 hour. The fabric is subsequently rinsed in cold water. The dyeing obtained is very level.

*Dyeing Example D*

30 parts of a dyestuff produced according to Example 1 and metallized in substance are ground in a ball mill together with 40 parts of "Lyocol O," 5 parts of "Flotite" and 225 parts of water. A nylon fabric is padded with the resulting finely dispersed suspension, steamed in wet steam for 2 minutes at 120° and subsequently soaped for 20 minutes at 80° with a 2% neutral soap solution. The dyeing obtained is very level. It is also very level when barré dyeing nylon, i.e., of irregular affinity, is used.

Formulae of representative dyes of the foregoing examples are as follows:

The 1:1 copper complex compound of the azo dye of the formula

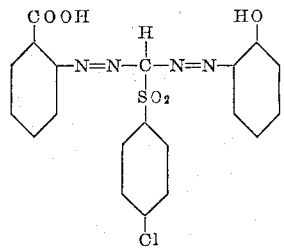

The 1:1 copper complex compound of the azo dye of the formula

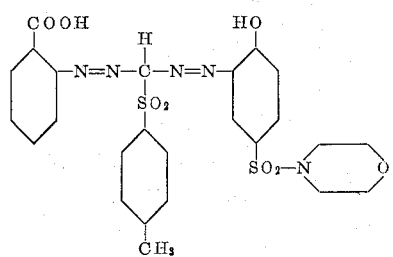

The 1:1 nickel complex compound of the azo dye of the formula

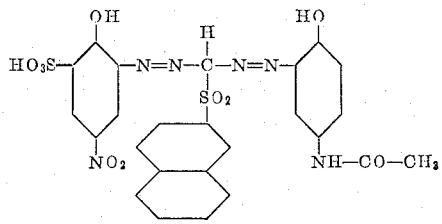

The 1:1 copper complex compound of the azo dye of the formula

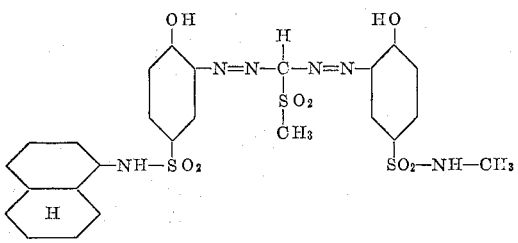

The 1:1 nickel complex compound of the azo dyes of the formula

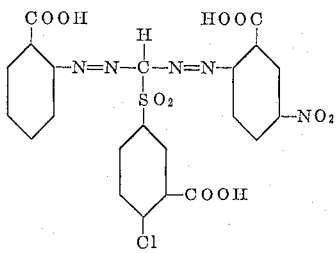

Having thus disclosed the invention what I claim is:
1. Azo dyestuff of the formula

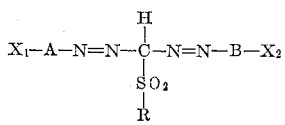

the 1:1 copper, 1:1 nickel, 1:1 cobalt or 1:1 zinc complex compounds thereof,
wherein A and B are different from each other and each is a radical selected from the group consisting of nitro-naphthalene, and naphthalene-sulfonic acid and an unsubstituted benzene radical and a substituted benzene radical, the substituents being selected from the group consisting of nitro, dinitro, chloro, dichloro, lower alkyl, di-lower alkyl, hydroxy, sulfonic acid, di-sulfonic acid, carboxylic acid, acetyl, acetylamino, pyrrolidonyl, oxyazolidonyl, carbethoxyamino, phenyl, sulfonic acid amide, lower alkyl sulfonyl, sulfonic acid lower alkyl amide, sulfonic acid-lower alkoxy-lower alkylamide, sulfonic acid-carboxy phenyl amide, sulfonic acid phenylamide, sulfonic acid-sulfophenylamide, sulfonic acid-di-lower alkyl amino lower alkylamide, sulfonic acid morpholide, sulfonic acid-di-lower alkyl amide, sulfonic acid-hydroxy-lower alkyl amide, sulfonic acid-phenyl-lower alkyl amide, sulfonic acid-naphthyl-amide, sulfonic acid-naphthyl-amide-sulfonic acid, sulfonic acid-lower alkoxy-phenylamide, sulfonic acid-di-lower alkoxy-phenylamide, sulfonic acid-N-lower alkyl-phenyl amide, sulfonic acid-lower alkyl-phenyl amide, sulfonic acid-chloro-phenyl amide, sulfonic acid-dichloro-phenylamide, amino-phenyl-carboxylic acid, sulfonic acid-phenyl amide-carboxylic acid, lower alkyl sulfamino, di-lower alkyl-amino-sulfamino, phenyl-fumaric acid amide, amino-chloro-phenyl, amino-phenyl, amino-phenyl-urea, amino-lower alkyl-phenyl, amino-lower-alkoxy-phenyl, carboxy-phenyl urea, amino-hydroxy phenyl, carboxy phenyl, amino-phenoxy-acetic acid, sulfonic acid-tetrahydro-naphthlamide, sulfonic acid-acetamino-phenylamide, sulfonic acid-lower alkylamino-lower alkylamide, and sulfonic acid-cyclohexylamide;
R is a member selected from the group consisting of tetrahydronaphthalene, a substituted and an unsubstituted benzene and naphthalene radical, the substituents of the substituted benzene radical being selected from the group consisting of lower alkyl, chloro, carboxylic acid, acetyl, benzoylamino, tri-lower alkyl, di-lower alkyl amino-sulfoamino, lower alkyl sulfonyl amino, di-lower alkylsulfonylamino, phthaloylamino, alkyl containing 1 to 12 carbon atoms, acetylamino, lower alkoxy, and the substituents of the substituted naphthalene radical being selected from the group consisting of acetylamino, sulfonic acid, carbethoxy amino, benzoylamino, and benzyl, phenylethyl, cyclohexyl, and methylcyclohexyl, and
each of $X_1$ and $X_2$ is a member selected from the group consisting of hydroxy, carboxylic acid and alkoxy, $X_1$ and $X_2$ occupying positions adjacent to one of the azo bridges in the above formula, 2. The 1:1 copper complex compound of the azo dye of the formula

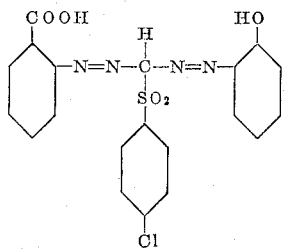

3. The 1:1 copper complex compound of the azo dye of the formula

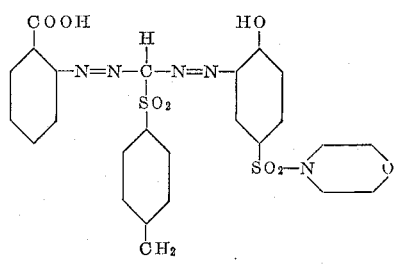

4. The 1:1 nickel complex compound of the azo dye of the formula

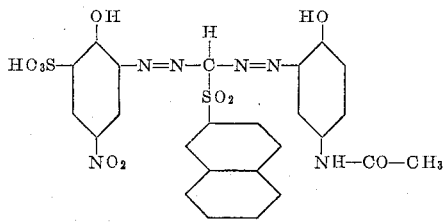

5. The 1:1 copper complex compound of the azo dye of the formula

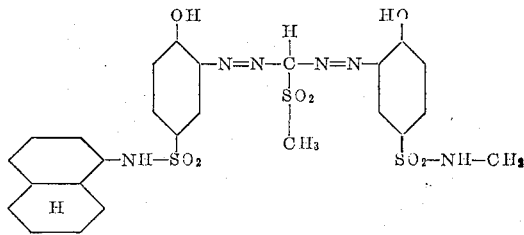

6. The 1:1 nickel complex compound of the azo dye of the formula

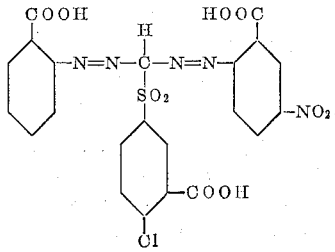

References Cited by the Examiner
UNITED STATES PATENTS
3,041,328   6/1962   Kraus _____ 260—148 X
3,102,109   8/1963   Steinemann _____ 260—146

CHARLES B. PARKER, *Primary Examiner.*

F. D. HIGEL, *Assistant Examiner.*